April 10, 1956 J. B. L. FOOT 2,741,696

PANORAMIC RECEIVER HAVING ZERO-BEAT DETECTOR

Filed Aug. 15, 1952 4 Sheets-Sheet 1

INVENTOR
John Bartram Lovell Foot

BY [signature]

ATTORNEY

April 10, 1956 J. B. L. FOOT 2,741,696

PANORAMIC RECEIVER HAVING ZERO-BEAT DETECTOR

Filed Aug. 15, 1952 4 Sheets-Sheet 2

INVENTOR
JOHN BARTRAM LOVELL FOOT
BY
[signature]
ATTORNEY

PANORAMIC RECEIVER HAVING ZERO-BEAT DETECTOR

INVENTOR
John Bartram Lovell Foot
BY
[signature]
ATTORNEY

PANORAMIC RECEIVER HAVING ZERO-BEAT DETECTOR

INVENTOR
John Bartram Lovell Foot
BY
[signature]
ATTORNEY 2,741,696

PANORAMIC RECEIVER HAVING ZERO-BEAT DETECTOR

John Bartram Lovell Foot, Northwood, England, assignor to The General Electric Company Limited, London, England Application August 15, 1952, Serial No. 304,513

Claims priority, application Great Britain August 17, 1951

14 Claims. (Cl. 250—20)

Figure 1:
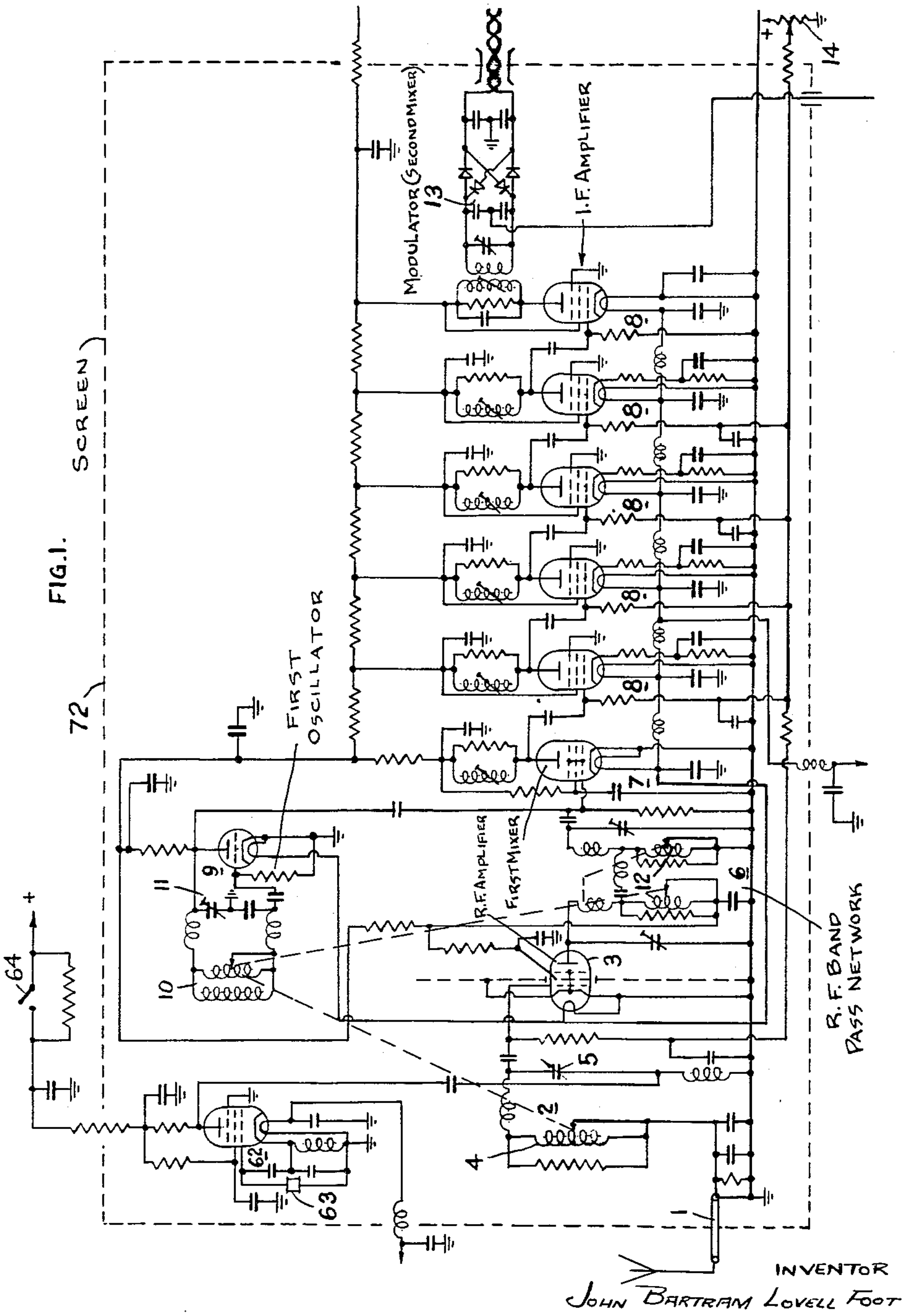

The present invention relates to radio receivers and is more particularly concerned with panoramic receivers.

By means of a panoramic receiver there may be produced a visual representation of the signals that are present in a band of radio frequencies and, in this connection, it has been proposed periodically to tune a radio receiver through a band of frequencies and to utilize the output from the receiver, which at any instant is a measure of the radio signal at the particular frequency to which the receiver is then tuned, to deflect a trace on the screen of a cathode ray tube. The frequency at which the screen is scanned is synchronized with the receiver tuning and the interval between successive traces is at least comparable with the persistence of vision so that the required "picture" is presented on the screen.

In one proposed form of panoramic receiver, the received signal covering the band of radio frequencies to be investigated is converted into a first intermediate frequency signal covering a band of frequencies. This intermediate frequency signal and a variable frequency oscillation are supplied to a mixer to provide a second intermediate frequency signal which is passed through a band-pass filter having a relatively narrow pass band before being rectified and fed to the deflector plates of a cathode ray tube. With such an arrangement, it will be realised that the trace would be deflected by an image component in the first intermediate frequency signal that has a frequency separated by twice the frequency of the variable frequency oscillation from a desired component of that intermediate frequency signal which would give a corresponding trace deflection. It is usual therefore to arrange for the frequencies of such image components to be outside the band of the received signal so as to prevent false responses being given as a result of break through of the received signal to the said mixer. This thus limits the band of frequencies that can be investigated with such a receiver.

It is one object of the present invention to provide a panoramic receiver which has a wide intermediate frequency band and in which the above mentioned difficulty is overcome.

According to the present invention, a panoramic receiver comprises a first oscillator, a first mixer which is arranged to beat a received signal covering a band of radio frequencies with the output from the first oscillator so as to produce an intermediate frequency signal covering a band of frequencies of a lower frequency than that of the received signal, a second oscillator the frequency of which may be varied over at least a part of the said band of frequencies of the intermediate frequency signal, a second mixer which is adapted to beat the intermediate frequency signal with the output from the second oscillator, means to derive from the output of the second mixer an electric signal when the frequency of the second oscillator is varied through that of a component of the intermediate frequency signal, means to supply an electric signal to a cathode ray tube associated with the receiver periodically to produce a trace on the screen of the cathode ray tube, means to vary the tuning of the second oscillator in synchronism with variations in the said electric signal for producing the trace, and means to apply the said electric signal derived from the output of the second mixer to deflect the said trace.

If the second mixer is of certain known types, any component of the intermediate frequency signal that is modulated may cause a spurious deflection of the trace that is not dependent upon the frequency of the second oscillator. Accordingly the second mixer is preferably a balanced modulator and is followed by a rectifier to produce the said electric signal which is derived from the output of the second mixer, the balanced modulator being arranged so that a modulated component of the intermediate frequency signal cannot cause the trace to be deflected except when the frequency of the second oscillator is varied through that of the component. It will be appreciated that there is no output from the balanced modulator when the frequencies of the signals supplied thereto actually coincide, although there is an output signal on either side of such coincidence so that if this output signal is used to deflect the trace without any smoothing, a component of the intermediate frequency signal gives rise to two deflections. A smoothing network may be associated with the rectifier for the purpose of causing a component of the intermediate frequency signal to produce only a single electric pulse which is applied to deflect the trace and thus give a single deflection. Switching means may be provided for selectively connecting a plurality of low-pass filter networks having different pass bands in the path between the second mixer and the rectifier so that the width of the pulses used to deflect the trace on the screen of the cathode ray tube may be varied. The rectifier may be a full-wave rectifier.

Preferably the frequency of the first oscillator is greater than the frequencies of the received signal.

The second oscillator may comprise a thermionic valve arranged as an amplifier stage and a plurality of further thermionic valves each arranged as cathode follower stages, this amplifier stage and the cathode follower stages being connected in a closed loop and the frequency of the oscillator being dependent upon a bias voltage supplied to the said valves of the cathode follower stages. If the cathode ray tube associated with the receiver is of the electromagnetic deflection type, the bias voltage supplied to the second oscillator for the purpose of varying the frequency may be derived from across resistance connected in series with the deflector coils which cause the electron beam of the cathode ray tube to be deflected to produce the trace. This ensures that there is the required synchronism between the trace and the tuning of the second oscillator irrespective of the waveform of the current in those deflector coils, although usually this current will have a substantially saw-tooth waveform.

Figure 2:
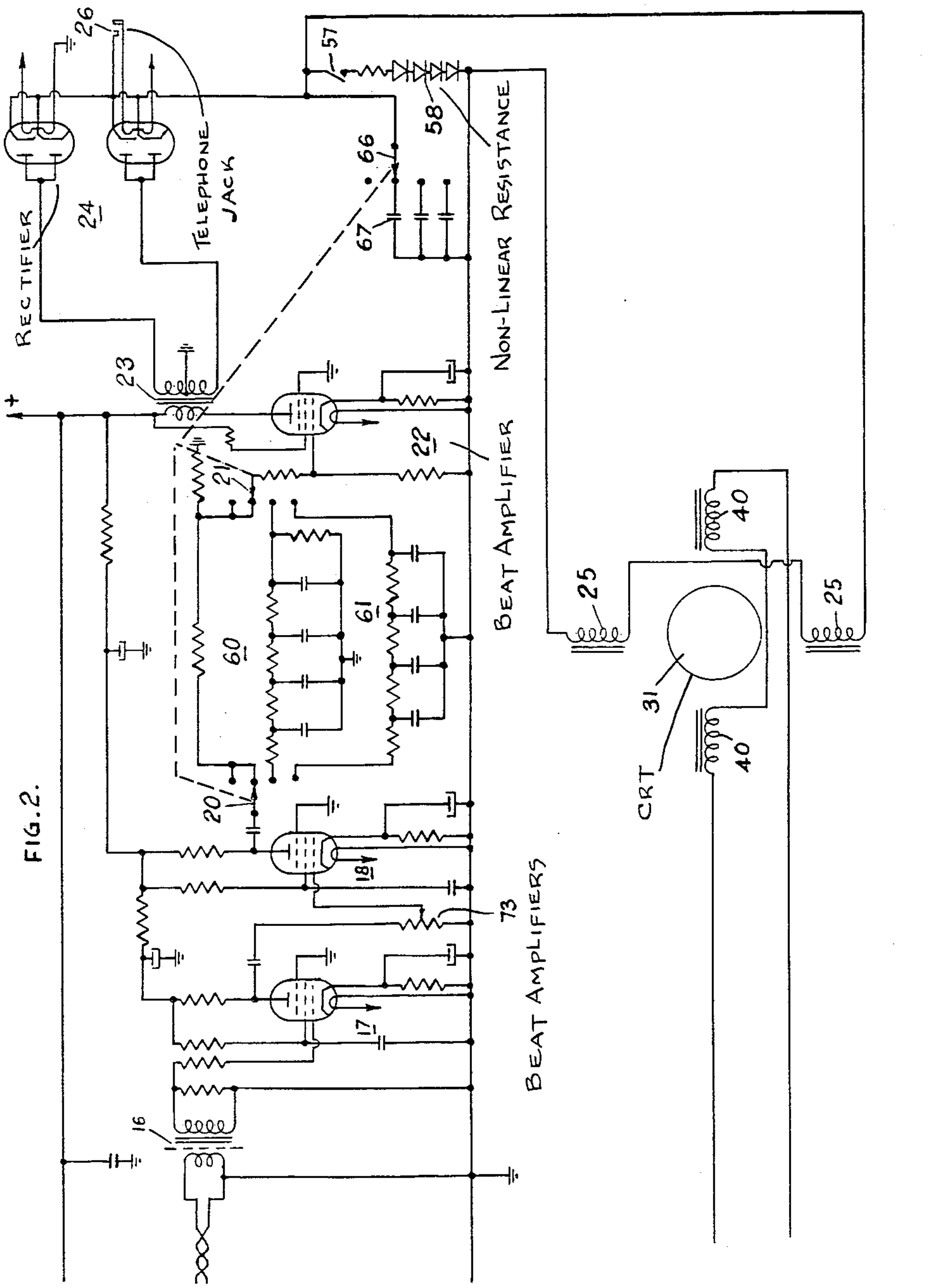
Figure 3:
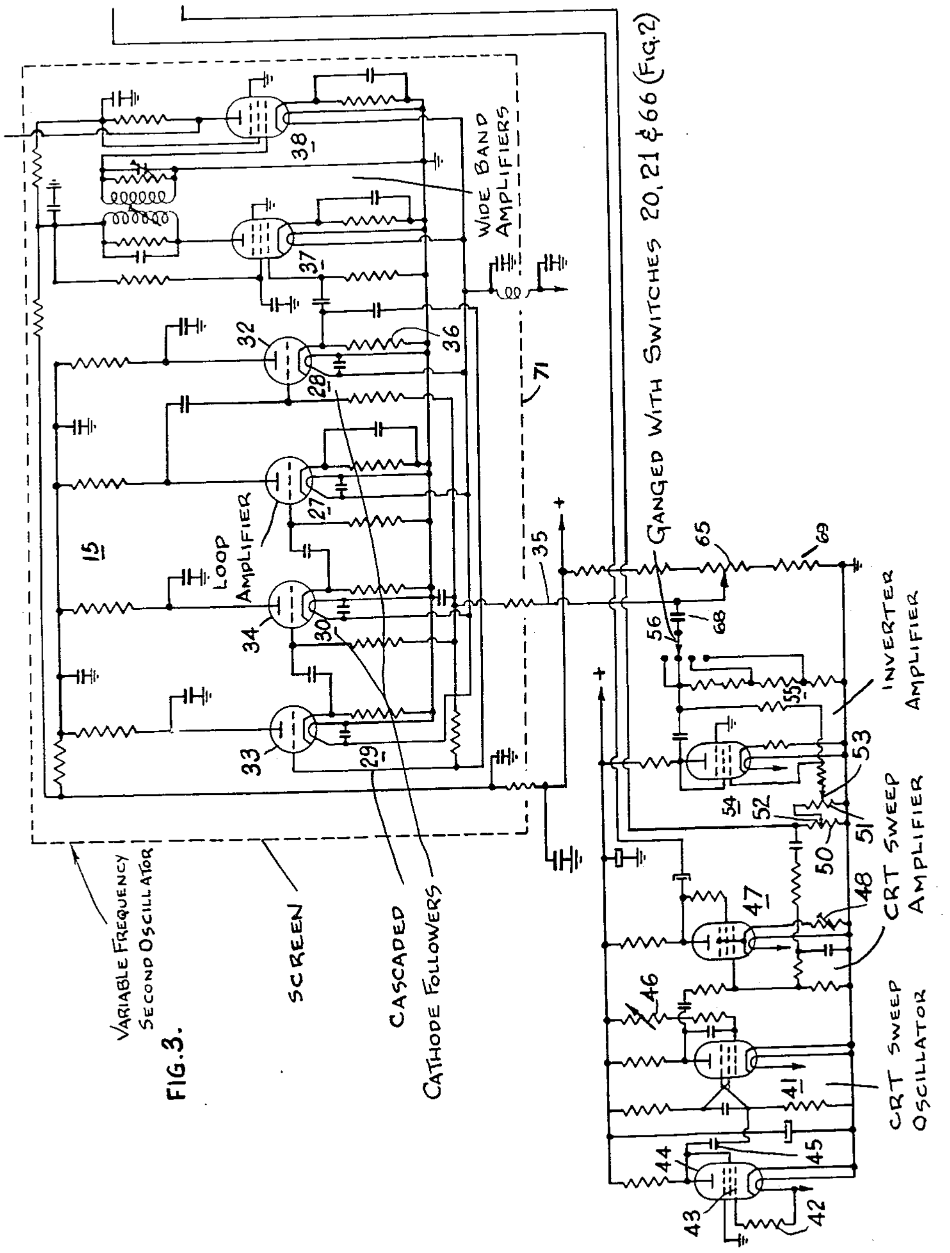
Figure 4:
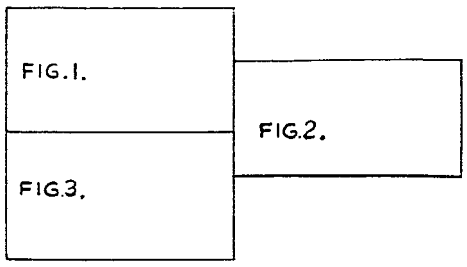
Figure 5:
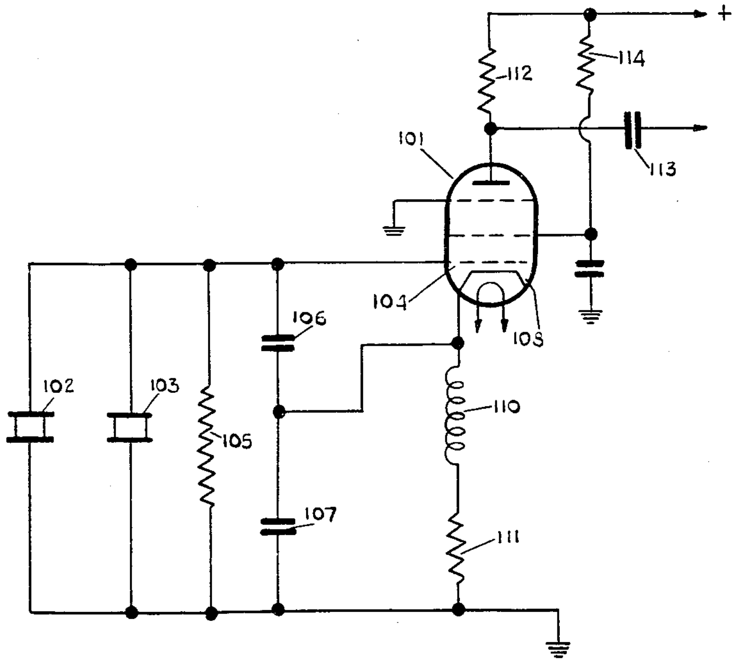

One arrangement of a panoramic receiver in accordance with the present invention, and which is arranged to cover the frequency band 80 to 220 megacycles per second, will now be described by way of example with reference to Figures 1 to 4 of the accompanying drawings in which Figures 1, 2 and 3 when positioned as shown in Figure 4 give the circuit diagram of the receiver. Figure 5 shows the circuit diagram of an alternative calibration oscillator for use in the receiver.

Referring to Figures 1 to 4, the received signal picked up by the aerial (not shown) is fed over a co-axial cable 1 and the signal developed across a parallel-tuned circuit 2 is fed to the control grid of a pentode valve 3 which acts as a radio frequency amplifier stage. The circuit 2 includes a variable inductance 4 which constitutes the main tuning control of the circuit 2 and a variable condenser 5 which may be used as a trimmer. The radio frequency signal passed by the valve 3 is fed through a band-pass network 6 to a mixer stage 7 to which is also applied an oscillation supplied by a local oscillator 9. This oscillator 9 is tunable over the range 140 to 280 megacycles per second, and for this purpose is provided with a main tuning inductance 10 and a preset trimmer condenser 11. The inductances 4 and 10 and the two inductances 12, which form part of the network 6, each have a sliding contact which is connected to short-circuit a portion of the coil. The tuning mechanisms (not shown) of these four inductances are ganged together.

A signal having the difference frequency of the signals supplied to the mixer stage 7 is fed through five intermediate frequency amplifier stages 8 which are stagger-tuned. The mean frequency of the intermediate frequency signal is 60 megacycles per second and extends 5 megacycles per second on either side of that frequency. The amplified intermediate frequency signal and the output from a variable frequency oscillator 15 are fed to a modulator 13. The frequency of the oscillator 15 is arranged to be continuously swept (as hereinafter described) over all or part of the band 55 to 65 megacycles per second. The overall response of the receiver up to the modulator 13 is arranged by adjustment of the trimmer condenser 5 to be substantially flat over the 10 megacycles per second band of the intermediate frequency signal.

The gain of the radio frequency amplifier stage and of the intermediate frequency amplifier stages 8 may be varied by means of a potentiometer 14.

The modulator 13 is a balanced modulator of the ring-type and it will be realised therefore that, when the frequency of the oscillation supplied by the oscillator 15 is equal to the frequency of a component of an intermediate frequency signal, there will be no output from the modulator 13. There will, however, be a beat frequency signal from the modulator 13 when the frequency of the oscillation supplied by the oscillator 15 is just below and just above the frequency of an intermediate frequency component. This beat signal is fed through a transformer 16 to amplifier stages 17 and 18. The signal supplied by the amplifier stage 18 is passed over switches 20 and 21 to another amplifier stage 22 while the output from the stage 22 is fed through a transformer 23 to a full-wave rectifier 24. In the absence of any smoothing, the output from the rectifier 24 would consist of pairs of pulses, each pair occurring one on either side of an instant at which the oscillation supplied by the oscillator 15 and a component of the intermediate frequency signal are the same frequency. The output from the rectifier 24 is, however, smoothed by a network comprising a condenser 67 so as to produce a single pulse which is applied to the vertical deflector coils 25 of a cathode ray tube 31 every time the frequency of the oscillator 15 is varied through the frequency of a component of the intermediate frequency signal.

The oscillator 15 comprises an amplifier stage 27 and three cathode follower stages 28, 29 and 30. These four stages 27 to 30 are connected in a closed loop, the amplifier stage 27 providing a phase shift of approximately 180 degrees while each of the cathode follower stages 28, 29 and 30 provides a phase shift of approximately 60 degrees at a particular frequency so that oscillation is maintained at that frequency. The frequency of the oscillator 15 may be varied by varying the grid bias supplied to the three valves 32, 33 and 34 over the path 35. The bias supplied over the path 35 is varied as hereinafter described. The oscillation developed across the cathode load resistor 36 in the cathode follower stage 28, that is to say the first cathode follower stage following the amplifier stage 27, is passed through two wide band amplifier stages 37 and 38 before being applied to the modulator 13.

The current in the horizontal deflector coils 40 of the cathode ray tube 31 is derived from a transitron oscillator 41 which operates at a frequency of 25 cycles per second.

It may be mentioned that the heater current for all the valves in this receiver are obtained from a transformer (not shown) the primary winding of which is connected across a 50 cycle per second alternating current supply and a portion of this alternating current signal is fed through a resistor 42 to the control grid 43 of a pentode valve 44 while the output signal from the valve 44 is fed through a condenser 45 so as to lock the oscillator 41. The output from the oscillator 41 is passed through an amplifier stage 47 to the deflector coils 40 and the frequency lock, which may be adjusted by means of a variable resistor 46, helps to stabilise the cathode ray the trace. The gain of the amplifier stage 47 which determines the maximum sweep amplitude of the cathode ray tube trace is adjustable by means of a preset resistor 48. The output from the amplifier stage 47 is also supplied to means (not shown) which is arranged to feed a signal to the cathode ray tube 31 to black out the trace during the flyback period.

The current through the deflector coils 40 also passes through a preset potentiometer 50 and the said bias voltage supplied over the path 35 is derived from this potentiometer 50. Adjustment of the tapping point 52 of the potentiometer 50 determines the maximum band of frequencies that can be presented simultaneously on the screen. Another potentiometer 51 is supplied from the tapping point 52 and adjustment of the position of the tapping point 53 of the potentiometer 51 enables the sweep band of the receiver to be varied during operation of the receiver. The voltage supplied by the tapping point 53 is passed through an inverter-amplifier across a potentiometer network 55. A switch 56 is provided to select all or part of the voltage developed across the network 55 for the purpose of varying the voltage range applied to the path 35.

It is required that the oscillator 15 shall periodically be tuned over a range of frequencies at a substantially constant rate but, with the construction of oscillator under consideration, it is found that a voltage having a saw-tooth waveform applied to the path 35 does not give the desired frequency sweep. In other words, the frequency of the oscillator 15 is not directly proportional to the voltage supplied over the path 35, more volts being required for a given frequency change at the upper end of the range. Accordingly the waveform of the voltage passed by the switch 56 is modified by applying that voltage to a circuit formed by a condenser 68 in series with part of a potentiometer 65 and a resistor 69, the voltage across the resistive portion of this circuit being applied to the path 35.

During operation of the receiver there is therefore a horizontal scan of the screen of the cathode ray tube 31 at a frequency of 25 times per second while the oscillator 15 is tuned cyclically at the same frequency. A vertical displacement of the horizontal trace is produced when there is an appropriate frequency component in the intermediate frequency signal. If a number of such deflections appear simultaneously on the cathode ray tube screen and are of widely different amplitudes, amplitude compression of the signal applied to the deflector coils 25 may be effected by closing a switch 57 which connects a non-linear resistance element 58 across the coils 25.

It will be appreciated that no image response can be introduced by the modulator 13 since it effectively operates at zero beat frequency. The image band associated with the mixer stage 7 is separated by 120 megacycles per second from the required band and is adequately attenuated by the circuit 2 and network 6, both of which are tuned in step with the oscillator 9.

Moreover, since the oscillator 15 and the radio frequency amplifier stage in combination with the intermediate amplifier stages 8 are contained within screens 71 and 72 respectively, there is no coupling between the oscillator 15 and the radio or intermediate frequency circuits such as might cause false deflections of the trace.

With the switch 56 in the position shown in the drawing, the oscillator 15 will be tuned over its maximum range of 10 megacycles per second (assuming the potentiometer 51 is set to maximum), so that the display on the screen of the cathode ray tube 31 will be in respect of radio frequency signals over a 10 megacycles per second band, the exact position of this band being determined by the setting of the inductance of the oscillator 9 which may be adjusted by hand. In the two lower positions of the switch 56, the sweep bands of the receiver are 2 and 0.4 megacycles per second respectively. The switches 20, 21 and 66 are ganged to the switch 56, the switches 20 and 21 being arranged to connect the resistance-capacity networks 60 and 61 between the amplifier stage 18 and the amplifier stage 22 while the switch 66 selects the appropriate condenser 67 (if any). In the position of the switches 20, 21 and 66 shown in the drawing, each frequency component of the intermediate frequency signal produces a single pulse from the rectifier 24 which gives rise to a deflection having a width equivalent to a band of about 50 kilocycles per second, while with the switches 20 and 21 operated to connect the network 60 or 61 in circuit, the switch 66 being operated simultaneously, this band is reduced to about 20 kilocycles per second or 9 kilocycles per second.

When investigating a band of received frequencies, the frequency scale of the "picture" presented on the screen may be expanded, with consequent reduction of the frequency band presented, by moving the tapping point 53 on the potentiometer 51. In the three positions of the ganged switches 20, 21, 56 and 66, already considered, the condensers 67 effect smoothing of the output of the rectifier 24 in that each frequency component produces a single pulse to deflect to cathode ray tube time. With these four switches in the uppermost position, the switches 20, 21 and 56 give the same connections as in the position shown but there is then no condenser 67 across the rectifier 24 so that each frequency component produces two deflections of the trace, one on each side of the point corresponding to frequency coincidence of that component of the intermediate frequency signal and the instantaneous frequency of the oscillator 15. In this manner it is possible to examine any particular trace deflection in more detail.

It has been found desirable to restrict the low frequency response of the circuits between the modulator 13 and the rectifier 24. This is effected partly by the transformers 16 and 23 which have relatively low inductances and partly by the values of the components in the amplifier stages 17 and 18 which are such that negative feed-back is applied to these stages at the lower frequencies. The magnitude of trace deflections may be adjusted by means of a potentiometer 73 between the stages 17 and 18.

A telephone jack 26 is provided so as to enable the modulation on a component signal which produces a trace deflection to be monitored. For this purpose the deflection is brought to the centre of the frequency band presented, that is to say the component in the intermediate frequency signal is made 60 megacycles per second, and the tapping point 53 is moved to stop the frequency scan of the oscillator 15 at that frequency. The condensers 67 are disconnected by means of the swich 66 and the frequency of the oscillator 9 is then shifted slightly by adjusting the trimmer condenser 11 so that the required component signal has a frequency slightly different from that of the oscillation supplied by the oscillator 15. The modulator 13 thus produces a second intermediate frequency signal which is passed through the amplifier stages 17, 18 and 22 to the rectifier 24 which acts as a discriminator so that the required modulation is obtained and fed to the jack 26.

A crystal oscillator 62 is provided for setting up and calibrating the receiver. This oscillator 62 includes a piezo-electric crystal 63 which has a natural frequency of two megacycles per second. The calibration oscillator 62 may be brought into operation by closing a switch 64 and the output of the oscillator 62 contains a plurality of harmonic oscillations. This output signal is fed to the control grid of the valve 3, and the tuning of the circuit 2 is adjusted so that it is resonant at a frequency of the order of 60 megacycles per second. It will be realised that the thirtieth harmonic of the crystal frequency, that is to say 60 megacycles per second, will then pass through the intermediate frequency amplifier stages 8, and will cause deflection of the cathode ray tube trace whether or not there is any received signal. Since the oscillator 15 is required to operate over a band having its mid-frequency at 60 megacycles per second, this calibration harmonic should produce a deflection of the trace at the centre of the screen. Adjustment to ensure that such is the case may be made by means of the potentiometer 65.

Moreover, if the crystal oscillator 62 is switched on during operation of the receiver, there are produced a number of deflections of the trace which correspond to accurately known frequencies so that these deflections form a frequency scale on the screen.

In place of the oscillator 62, the oscillator shown in Figure 5 of the accompanying drawings may be used. Referring now to Figure 5, this oscillator comprises a pentode valve 101 and the operating frequency of the oscillator is determined by two piezo-electric crystals 102 and 103 which are connected directly in parallel between the control grid 104 of the valve 101 and earth. The natural frequencies of the crystals 102 and 103 are six and ten megacycles per second respectively. A resistor 105 is connected in parallel with the crystals 102 and 103 so as to provide a direct current path between the grid 104 and earth while two condensers 106 and 107 are also connected between the grid 104 and earth, the cathode 108 of the valve 101 being connected to the junction of the condensers 106 and 107. An inductance 110 and a resistor 111 are connected in series between the cathode 108 and earth. A load resistor 112 is connected in the anode circuit of the valve 101, the output signal from the oscillator being supplied through a condenser 113, while the necessary screen grid voltage is obtained through a resistor 114.

It is found that this oscillator operates so as to produce component oscillations that are spaced apart by a frequency of two megacycles per second and, at least in the upper region of the band covered by the receiver, these component oscillations are of comparable amplitude and considerably greater than those produced by a single two megacycle per second crystal. This is believed to be due to the beating together in the valve 101 of harmonics of the natural frequencies of the crystals 102 and 103. It will be realised that the natural frequencies of the crystals 102 and 103 are the third and fifth harmonics of the frequencies spacing of the component oscillations.

If now the crystals 102 and 103 are not quite equal to harmonics of the said frequency spacing, the component oscillations produced by the oscillator are amplitude modulated at relatively low frequency. Thus, when using crystals in the oscillator described above which are nominally six and ten megacycles per second but which in fact, owing to normal manufacturing tolerances, are slightly off those frequencies, it has been found that the component oscillations all carry an audio frequency modulation of the order of five kilocycles per second. Each of these component oscillations produces a calibration deflection or "pips" on the screen of a cathode ray tube 31 (Figure 1) as described above but these "pips" now have a characteristically ragged edge, due to this modulation, which enables them easily to be identified.

I claim:

1. A panoramic receiver comprising a first oscillator, a first mixer to beat a received signal which lies in a band of radio frequencies with the output from the first oscillator so as to produce an intermediate frequency signal which lies in a band of frequencies of lower frequency than that of the received signal, a tunable second oscillator, a second mixer to beat the intermediate frequency signal with the output from the second oscillator, a cathode ray tube, means to supply an electric scanning signal to the cathode ray tube periodically to produce a trace on the screen of the cathode ray tube, means to vary the tuning of the second oscillator over at least a part of the band of frequencies of the intermediate frequency signal in synchronism with variations in the said electric scanning signal, means to derive from the output of the second mixer an electric deflecting signal when the frequency of the second oscillator is varied through that of a component of the intermediate frequency signal, and means to apply the said electric deflecting signal to deflect the said trace.

2. A panoramic receiver according to claim 1 wherein the second mixer is a balanced modulator and is followed by a rectifier to produce the said electric deflecting signal, the balanced modulator being such that a modulated component of the intermediate frequency signal cannot cause the trace to be deflected except when the frequency of the second oscillator is varied through that of the component.

3. A panoramic receiver according to claim 2 wherein a smoothing network is connected between the said rectifier and the cathode ray tube for the purpose of causing a component of the intermediate frequency signal to produce only a single pulse in the said deflector signal when the frequency of the second oscillator is varied through that of the component.

4. A panoramic receiver according to claim 3 wherein there is switching means to enable the smoothing network selectively to be either connected in circuit or to be disconnected.

5. A panoramic receiver according to claim 2 wherein means is provided to connect a low pass filter network, in the path between the second mixer and the rectifier.

6. A panoramic receiver according to claim 5 wherein a plurality of low-pass filter networks having different pass bands are provided and there is switching means arranged selectively to connect these networks between the second mixer and the rectifier.

7. A panoramic receiver according to claim 2 wherein the said rectifier is a full-wave rectifier.

8. A panoramic receiver according to claim 1 wherein the frequency of the first oscillator is greater than the frequencies of the received signal.

9. A panoramic receiver according to claim 1 wherein the second oscillator comprises a thermionic valve arranged as an amplifier stage and a plurality of further thermionic valves each arranged as cathode follower stages, this amplifier and the cathode follower stage being connected in a closed loop and the frequency of the oscillator being dependent upon a bias voltage supplied to the said valves of the cathode follower stages.

10. A panoramic receiver according to claim 9 wherein the cathode ray tube is of the electromagnetic deflection type, and wherein the said bias voltage supplied to the second oscillator for the purpose of varying the frequency thereof is derived from across resistance connected in series with the deflector coils which are arranged to cause the electron beam of the cathode ray tube to be deflected to produce the trace.

11. A panoramic receiver according to claim 1 wherein a crystal controlled oscillator is arranged to supply a plurality of harmonic oscillations to the first mixer for the purpose of providing deflections of the trace corresponding to known frequencies.

12. A panoramic receiver according to claim 11 wherein two piezoelectric crystals are provided in parallel-connected paths to control the operation of the oscillator, the natural frequencies of these two crystals being substantially equal to $a$F and $b$F respectively where $a$ and $b$ are different integers that have no common factor and F is the frequency separation of the harmonic oscillations supplied by the oscillator.

13. A panoramic receiver according to claim 1 wherein means is provided effecting amplitude compression of the electric deflecting signal before that signal is utilized to deflect the said trace.

14. A panoramic receiver according to claim 13 wherein there is switching means to enable the amplitude compressing means selectively to be either connected in circuit or to be disconnected.

References Cited in the file of this patent

UNITED STATES PATENTS

| | | |
|---|---|---|
| 1,611,221 | Nyquist | Dec. 12, 1926 |
| 1,813,922 | Hansell | July 14, 1931 |
| 2,138,341 | Crosby | Nov. 29, 1938 |
| 2,288,486 | Rivlin | June 30, 1942 |
| 2,321,269 | Artzt | June 8, 1943 |
| 2,455,052 | Fisher | Nov. 30, 1948 |
| 2,506,329 | Ames | May 2, 1950 |
| 2,553,602 | Perroux | May 22, 1951 |
| 2,572,216 | Taylor | Oct. 23, 1951 |
| 2,586,894 | Williams | Feb. 26, 1952 |
| 2,608,652 | Heller | Aug. 26, 1952 |
| 2,645,711 | Hardy | July 14, 1953 |
| 2,658,138 | Samuelson | Nov. 3, 1953 |

FOREIGN PATENTS

| | | |
|---|---|---|
| 570,390 | Great Britain | July 5, 1945 |

OTHER REFERENCES

Article: "Panoramic Principles" by Moulic, pages 86 to 88, 206, of Electronic Industries for July 1944.